No. 764,602. PATENTED JULY 12, 1904.
F. LAMBERT.
WATER METER.
APPLICATION FILED APR. 28, 1902.
NO MODEL.

Attest:
Geo. H. Botts
Mabelle F. Lake

Inventor:
Frank Lambert
By Edith J. Griswold
Atty.

No. 764,602.

Patented July 12, 1904.

UNITED STATES PATENT OFFICE.

FRANK LAMBERT, OF BROOKLYN, NEW YORK.

WATER-METER.

SPECIFICATION forming part of Letters Patent No. 764,602, dated July 12, 1904.

Application filed April 28, 1902. Serial No. 105,060. (No model.)

*To all whom it may concern:*

Be it known that I, FRANK LAMBERT, a citizen of the United States, and a resident of New York city, borough of Brooklyn, Kings county, State of New York, have invented Improvements in Water-Meters, of which the following is a specification.

This invention relates to water-meters, and has for its object to construct a meter having an external pressure-casing and a measuring-chamber adapted under special conditions to occupy different positions in the said casing and yet preserve a tight joint between said casing and measuring-chamber in the various relative positions. I accomplish this object by adapting a measuring-chamber to move and act within the pressure-casing in the manner of a piston.

In the accompanying drawings I have shown several different constructions to illustrate my invention; but I do not limit myself to the forms here shown.

Figure 1:
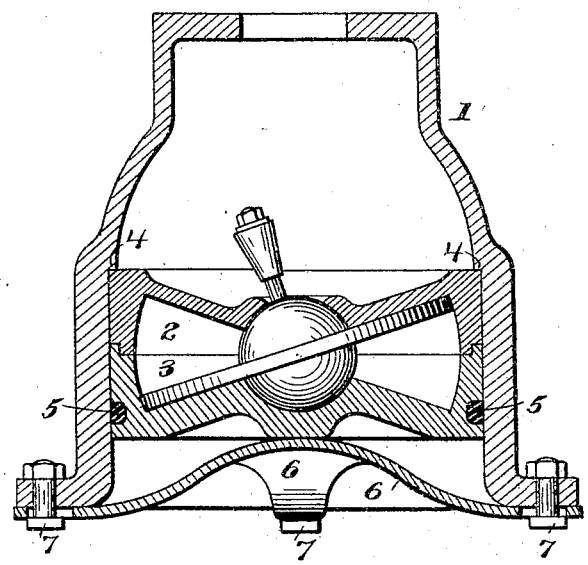
Figure 2:
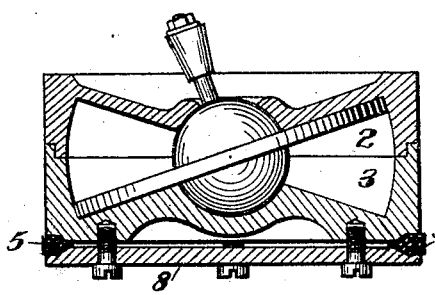
Figure 3:
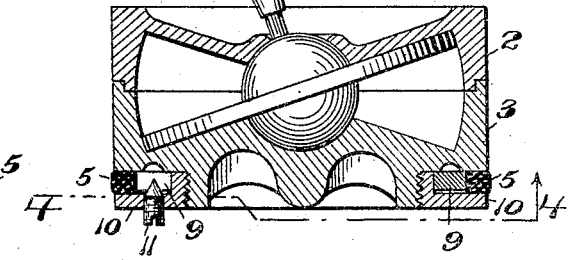
Figure 4:
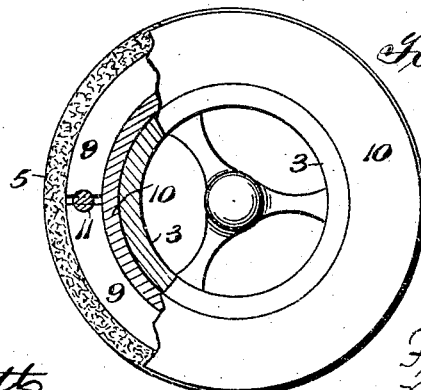

Figure 1 is a central sectional elevation of as much of a meter as is necessary to illustrate my invention, showing my improved construction. Fig. 2 is a central sectional elevation of a measuring-chamber showing a modification. Fig. 3 is a similar view to Fig. 2, showing another modification. Fig. 4 is a plan view taken on line 4 4 of Fig. 3.

The generic construction and operation of meters of the kind here shown are so well known that a description thereof is omitted.

Referring to Fig. 1, the external casing 1 is formed with an opening for the admission of the measuring-chamber 2 3, which chamber closes the said opening. The measuring-chamber may be formed of any number of sections, the construction shown in Fig. 1 having two sections 2 and 3 capable of being moved apart. This measuring-chamber is closely but freely fitted in the bored portion of the casing 1 and is stopped in normal position by coming against a shoulder 4 in the casing. A water-tight joint is made between the casing and the chamber by a relatively soft packing 5 at the periphery of the chamber. As shown in Fig. 1, the packing 5 is held in a circular groove in the lower section 3 of the chamber. The outer end of the bore of the casing 1 is flared to permit the packing 5 to be compressed as it enters the casing. It will readily be seen that with such a construction as soon as the chamber is well within the bore of the casing the packing 5 can make a water-tight joint between the chamber and the casing in any position the chamber may occupy in the said bore. Any suitable means for holding the loose section 2 3 of the measuring-chamber together firmly and in normal position may be used. As shown, such means may consist of a leaf-spring 6, secured to the casing 1 by bolts 7 and pressing against the lower section 3 of the measuring-chamber. The spring 6 normally tends to push the measuring-chamber into its seat in the casing 1 with sufficient force to resist the normal internal-pressure water-service. By the foregoing it will be seen that the measuring-chamber 2 3 is adapted to act in the manner of a piston in the casing 1 and maintain a tight water-service-pressure joint and prevent leaking even if the chamber or its sections are moved out of normal position from abnormal causes, such as water-hammer or freezing.

Fig. 2 shows a modification in the construction of the measuring-chamber permitting of adjustment of the tightness of the joint. In this construction the packing 5 is held in place by a disk 8, suitably secured to section 3 of the measuring-chamber. The packing 5 rests in opposite grooves in the adjacent peripheral edges of the measuring-chamber and the disk 8, and it will be evident that by screwing up the disk nearer the measuring-chamber the packing will be compressed and forced outward tighter against the casing.

Figs. 3 and 4 show another modification of the measuring-chamber adapted to act in the manner of a piston. The packing 5 and a split ring 9 are held in position between the measuring-chamber and a ring 10. A pointed screw 11, threaded in the ring 10, has its point inserted in the slit of the ring 9. By adjusting the screw 11 the split ring 10 will be made to expand and force the packing outward to tighten the joint against the external casing.

I claim as my invention—

1. In a water-meter, a pressure-casing, a measuring-chamber closing said casing and adapted under special conditions to slide in said casing, and means to preserve between said chamber and said casing a tight joint against water-service pressure in all its various positions in the casing.

2. In a water-meter, a pressure-casing and a measuring-chamber forming respectively a piston-casing and a piston sliding therein, said parts adapted to maintain a tight water-service-pressure joint between their adjacent sliding faces in various relative positions.

3. In a water-meter, a pressure-casing, a measuring-chamber mounted therein adapted to act in the manner of a piston, said chamber having a packing at its periphery making with said pressure-casing a tight joint against water-service pressure.

4. In a water-meter, a pressure-casing, a measuring-chamber therein adapted under special conditions to occupy various positions in said pressure-casing and to preserve in said pressure-casing a tight joint against water-service pressure in various positions, and means to adjust the tightness of said joint.

In testimony whereof I have signed my name to this specification in the presence of two subscribing witnesses.

FRANK LAMBERT.

Witnesses:
EDITH J. GRISWOLD,
MABELLE F. LAKE.